United States Patent
Somero

[15] 3,656,366
[45] Apr. 18, 1972

[54] COLLAPSIBLE STEERING COLUMN

[72] Inventor: Leonard A. Somero, Thayer Road, New Ipswich, N.H. 03071

[22] Filed: Feb. 1, 1971

[21] Appl. No.: 111,179

[52] U.S. Cl. ............................................................. 74/492
[51] Int. Cl. ........................................................... B62d 1/18
[58] Field of Search ............................................ 74/492, 493

[56] References Cited

UNITED STATES PATENTS

| | | | |
|---|---|---|---|
| 2,639,626 | 5/1953 | Snyder | 74/493 |
| 3,435,700 | 4/1969 | Calhoun | 74/493 |
| 3,483,768 | 12/1969 | Glass | 74/492 |

Primary Examiner—Milton Kaufman
Attorney—Ronald L. Engel, Daniel W. Vittum, Jr., Gomer W. Walters, John A. Waters and James M. Amend

[57] ABSTRACT

A collapsible steering column for connecting an automotive steering wheel with the automotive steering actuating mechanism includes a cylindrical shaft having the steering wheel attached at one end and a disengageable support bearing engaging a transverse groove on the shaft. The opposite end of the shaft is formed into a hexagonal cross section which is positioned through a mating hexagonal opening in a hydraulic cylinder. Within the hydraulic cylinder, and attached to the end of the shaft there is a hydraulic piston having pressure relief holes through the piston to permit the flow of hydraulic fluid through the holes when the piston is moved. The opposite end of the hydraulic cylinder is operably attached to the steering actuating mechanism of the automobile so that rotational movement of the steering wheel, shaft and cylinder is converted by the steering actuating mechanism to impart steering force to the linkage attached to the front wheels of the automobile. When a predetermined force is applied to the steering wheel in a direction essentially parallel to the shaft, the disengageable support bearing disengages from the transverse groove on the shaft permitting the shaft and steering wheel to slide away from the driver. The hydraulic cylinder and piston act as a cushioning shock absorber as the shaft and piston slide through the cylinder.

4 Claims, 5 Drawing Figures

PATENTED APR 18 1972  3,656,366

INVENTOR.
LEONARD A. SOMERO
BY Gower W. Walters
ATTY.

COLLAPSIBLE STEERING COLUMN

BACKGROUND OF THE INVENTION

1. Field of the Invention

The present invention relates to collapsible steering columns for automobiles, and more particularly this invention relates to a collapsible steering column for an automobile supported by a disengageable roller bearing during normal operations, the roller bearing being disengaged from the steering column when an abnormal force is applied, such as during an automobile accident.

2. Description of the Prior Art

A collapsible steering column for an automobile must be able to meet various requirements to provide adequate steering capabilities without collapsing during normal driving, but permit free collapse during an automobile accident to prevent serious injury to the driver. A collapsible steering mechanism must, in order to meet the requirements of ordinary driving, provide a firm stable base for gripping and steering by the driver. Consequently, the collapsible steering mechanism must remain in an extended position during normal driving without collapsing as a result of ordinary forces exerted by the driver during steering and driving operations. It would be extremely dangerous to provide a collapsible steering column that collapses during normal driving operations thereby causing the driver to lose control of the automobile.

The collapsible steering column must be designed to assure that the column will collapse when a predetermined amount of force is exerted as a result of an automobile accident, thus permitting the steering wheel to slide away from the driver and thereby reducing the possibility of serious injury. A collapsible steering column must not require such force to cause it to collapse that serious bodily injury would result to the driver.

Moreover, once the steering mechanism commences to collapse, a dampening or cushioning means must be provided to cushion the impact of the driver's body against the steering wheel during a collision. If the steering column rapidly collapses during an automobile accident, the possibility of injury to the driver could be as great, if not greater, than the possibility of injury if no collapsible steering column is provided at all. Consequently, the ideal collapsible steering mechanism provides a locking mechanism that holds the steering wheel in the normal position during normal use without restricting or inhibiting the steering operations, but immediately releases when a predetermined amount of force is exerted during an accident, and a dampener or cushioning mechanism which slows the collapse of a steering column to provide the ultimate cushioning effect to the body of the driver during an accident.

BRIEF SUMMARY OF THE INVENTION

In accordance with the present invention, a collapsible steering column for connecting an automotive steering wheel with an automotive steering actuating mechanism comprises a cylindrical shaft having the steering wheel attached at one end and having at the opposite end engaging means. Provided in the shaft adjacent the end to which the steering wheel is attached is a transverse groove. Positioned about the shaft adjacent the transverse groove is a disengageable support bearing means which permits free rotational movement of the shaft but which inhibits movement of the shaft in the direction along the center line of the shaft until sufficient force is applied to disengage the disengageable support bearing means from the transverse groove. The opposite end of the shaft is inserted through an opening in the end of a hydraulic cylinder and a piston is positioned inside the cylinder on the shaft. The engaging means on the shaft engage the opening in the hydraulic cylinder so that rotation of the shaft causes the hydraulic cylinder to rotate, but the shaft can freely slide through the opening in a direction along the center line of the shaft. The opposite end of the hydraulic cylinder is operably attached to the automotive steering actuating mechanism so that rotational movement of the shaft and cylinder is converted by the automotive steering actuating mechanism to impart steering force to the linkage attached to the front wheels of the automobile.

When a predetermined amount of force is applied to the steering wheel essentially parallel to the center line of the shaft, the disengageable support bearing disengages with the transverse groove, thereby permitting the shaft to move in the direction of the force. As the shaft moves, the piston on the end of the shaft is moved within the hydraulic cylinder. Holes are provided through the piston to permit the hydraulic fluid to flow through the openings to equalize pressure on both sides of the piston as it moves through the hydraulic cylinder. The holes in the piston are small enough to restrict the flow of the hydraulic fluid to such an extent that the rate of movement of the shaft and steering wheel is dampened and a cushioning effect for the driver's body is created.

Thus, it is a primary object of the present invention to provide a collapsible steering column for an automobile that maintains its normal extended position during driving operations but which easily collapses when an accident occurs and which will not accidentally collapse as a result of the normal forces applied by the driver during driving operations.

A further object of the present invention is to provide a collapsible steering column for an automobile which permits rapid release of the steering column when a predetermined amount of force is applied, such as during an automobile accident.

A further object of the present invention is to provide a collapsible steering column for an automobile which dampens the movement of the steering column and steering wheel during an accident to provide a maximum cushioning effect to the body of the driver.

These and other objects, advantages and features of the subject invention will hereinafter appear, and for purposes of illustration, but not of limitation, an exemplary embodiment of the present invention is illustrated in the accompanying drawings.

DETAILED DESCRIPTION OF THE PREFERRED EMBODIMENT

Figure 1:
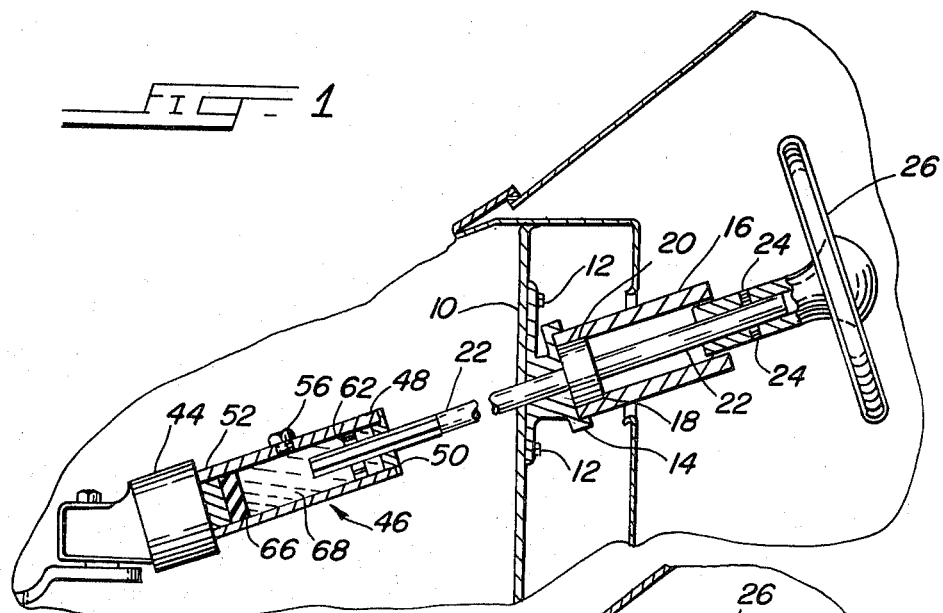
FIG. 1 is a side partially cross sectional elevational view of a preferred embodiment of the present invention, showing the steering column in a normal extended condition.
Figure 2:
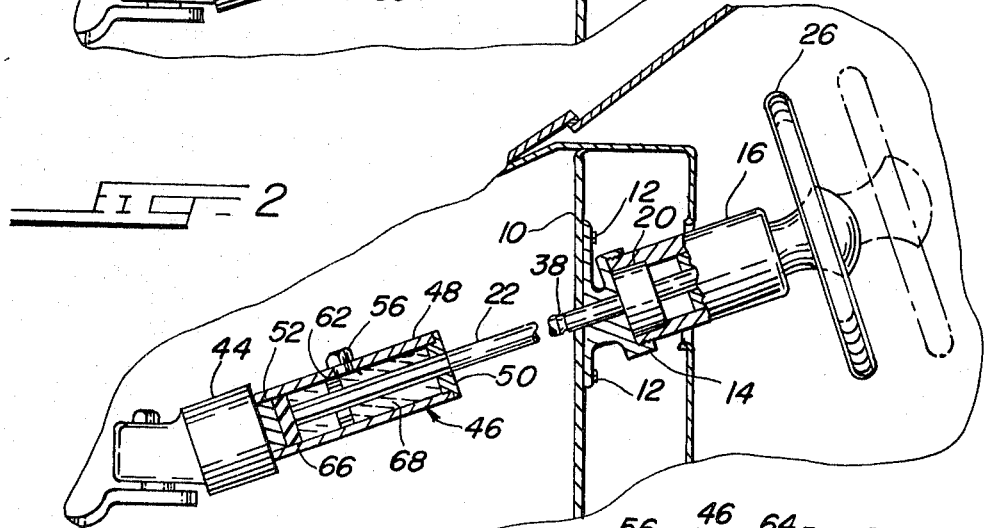
FIG. 2 is a side partially cross sectional elevational view of the embodiment shown in FIG. 1, showing the steering column in a collapsed position.

With respect to FIGS. 1 and 2, attached to frame 10 of automobile (not shown) by bolts 12 is support bracket 14. Threaded into support bracket 14 is cylindrical sleeve 16. Positioned within the interior surface of the threaded end of cylindrical sleeve 16 is disengageable roller bearing 20. Inserted through an opening in the support bracket 14 and through the disengageable roller bearing 20 is a shaft 22. Attached to one end of shaft 22 by set screws 24 is steering wheel assembly 26.

Figures 3, 4, 5:
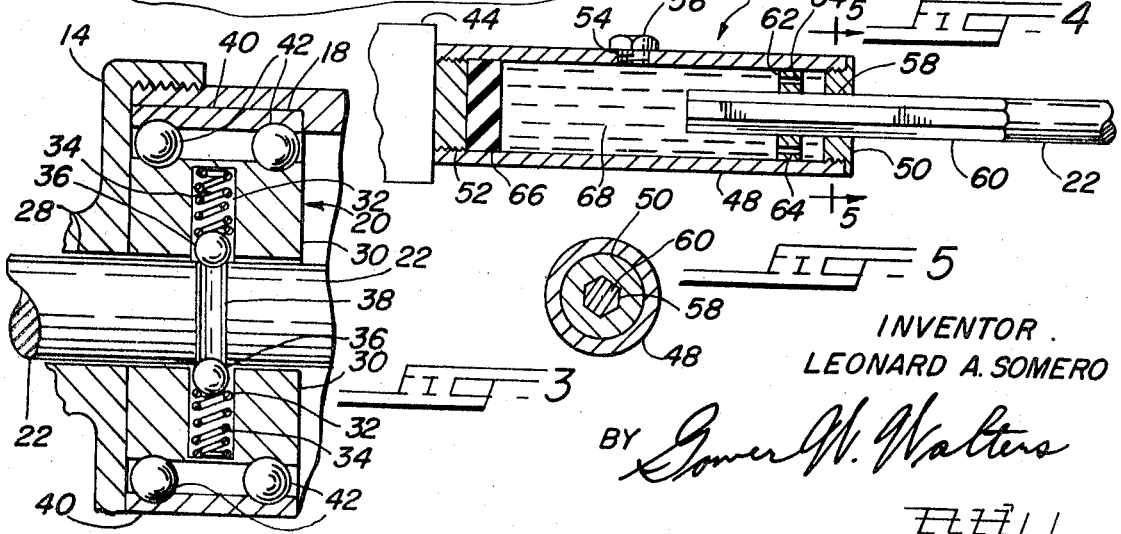
FIG. 3 is a cross sectional fragmentary view of the support bearing of the present invention.
FIG. 4 is a cross sectional fragmentary view of the hydraulic cylinder of the embodiment as shown in FIGS. 1 and 2.
FIG. 5 is a cross sectional view taken substantially along lines 5—5 of FIG. 4.

With reference to FIG. 3, shaft 22 extends through disengageable roller bearing 20 and through circular opening 28 in support bracket 14. Disengageable roller bearing 20 comprises a first annular sleeve 30 positioned immediately about shaft 22. Positioned at equal intervals radially about the interior surface of first annular sleeve 30 are circular recessions 32. Positioned within circular recessions 32 are springs 34. Also positioned in circular recession 32 against springs 34 are roller balls 36 which ride in a transverse groove 38 in shaft 22.

Disengageable roller bearing 20 further comprises a second annular sleeve 40 which is positioned immediately about first annular sleeve 30. Second annular sleeve 40 and first annular sleeve 30 are separated by roller bearings 42 which permit first annular sleeve and second annular sleeve 40 to rotate freely with respect to one another. Thus, a double bearing effect is created since shaft 22 may freely rotate with respect to first annular sleeve 30 since roller balls 36 are free to rotate in transverse groove 38. In addition, first annular sleeve 30 is free to rotate with respect to second annular sleeve as a result of the relatively frictionless support of roller bearings 42.

Provided in automobile (not shown) is steering actuating mechanism box 44. Operably connected to steering actuating mechanism box 44 is hydraulic cylinder 46. Hydraulic cylinder 46 comprises a hollow cylindrical sleeve 48 and caps 50 and 52 threaded into opposite ends of hollow cylindrical sleeve 48. Provided at approximately the center of the wall of hollow cylindrical sleeve 48 is threaded opening 54 in which is inserted bolt 56. Through the center of cap 50 is provided a hexagonal opening 58 (illustrated in FIG. 5). The end of shaft 22 opposite the end to which steering wheel assembly 26 is attached is formed into a hexagonal cross section portion 60 which is dimensioned to slidably fit through hexagonal opening 58 in cap 50. Positioned about hexagonal cross section portion 60 of shaft 22 within hollow cylindrical sleeve 48 is annular piston 62. Annular piston 62 is dimensioned to slidably fit within the hollow cylindrical sleeve 48. Provided through annular piston 62 are openings 64 (illustrated in FIG. 4). Also positioned within hollow cylindrical sleeve 48 adjacent cap 52 is a rubber stop 66. Hydraulic fluid 68 is placed in hydraulic cylinder 46 by removing bolt 56 and pouring the hydraulic fluid 68 through threaded opening 54.

During normal driving conditions, steering wheel assembly 26 is in its normal extended position as illustrated by FIG. 1. Rotation of steering wheel assembly 26 in either direction exerts a force through shaft 22 and as a result of the hexagonal cross section portion 60 engaging hexagonal opening 58 in hydraulic cylinder 46, hydraulic cylinder 46 is rotated through an equal angular arc. This angular rotation of hydraulic cylinder 46 is converted by steering actuating mechanism box 44 into steering force to the linkage attached to the front wheels of the automobile (not shown). Steering wheel assembly 26 is held in its normal extended position (as illustrated in FIG. 1) as a result of springs 34 pressing roller balls 36 into transverse groove 38 on shaft 22. Springs 34 provide sufficient force to hold shaft 22 in its normal extended position even though the driver may exert normal operating forces against steering wheel assembly 26.

However, if an abnormal amount of force is exerted against steering wheel assembly 26 in a direction essentially parallel to the center line of shaft 22 (such as during an automobile accident), springs 34 permit roller balls 36 to disengage transverse groove 38 to permit steering wheel assembly and shaft 22 to slide away from the driver. Shaft 22 slides through disengageable roller bearing 20 and support bracket 14. Hexagonal cross section portion 60 of shaft 22 can freely slide through hexagonal opening 58 in cap 50. This causes annular piston 62 to slide through hollow cylindrical sleeve 48 of hydraulic cylinder 46. Hydraulic fluid 58 exerts an inhibiting force against annular piston 62 and thus a pressure differential is created on opposite sides of annular piston 62. As a result of this pressure differential, the hydraulic fluid flows through openings 64 in annular piston 62 thus tending to equalize the pressure differential. This flow of hydraulic fluid 68 through opening 64 in annular piston 62 provides a dampening or cushioning effect on the rate of movement of shaft 22 and steering wheel assembly 26 during an automobile accident. Shaft 22 and annular piston 62 continue to move as long as force is exerted against steering wheel assembly 26 until the end of shaft 22 contacts rubber stop 66. At this point, steering wheel assembly 26 is in its collapsed position as illustrated by the solid lines in FIG. 2. In its collapsed position, steering wheel assembly 26 has moved sufficient distance away from the driver of the automobile to preclude the possibility of the driver being pinned against the seat as a result of the automobile accident. Further, the cushioning effect caused by hydraulic cylinder 46 reduces the possibility of severe bodily injury to the driver as a result of contacting the steering assembly 26 during an automobile accident.

The embodiment described above is directed towards a specific embodiment illustrated herein, but it should be expressly understood that various changes, modifications, and variations in the structure and function of the present invention may be effected without departing from the spirit and scope of the present invention as defined in the appended claims.

I claim:

1. A collapsible steering column connecting an automotive steering wheel to an automotive steering actuating mechanism comprising:
   a cylindrical shaft having the steering wheel attached at one end thereof;
   a transverse groove formed in said shaft adjacent the end to which the steering wheel is attached;
   engaging means formed on the opposite end of said shaft;
   support bearing means comprising disengageable roller means extending into and engaging with said transverse groove, said disengageable roller means disengaging said transverse groove in response to the application of a predetermined external force on the steering wheel in a direction essentially along the center line of said shaft;
   a hollow hydraulic cylinder means operably connected to one end of the steering actuating mechanism and having an opening in the opposite end through which said slidable engaging means of said shaft is positioned, said opening engaging said engaging means on said shaft to rotate said hydraulic cylinder means when said shaft is rotated and to permit said shaft to freely slide through said opening when said shaft moves in a direction essentially along the center line of said shaft;
   piston means positioned within said hydraulic cylinder means, said piston means attached to said shaft adjacent the end of said shaft extending through said opening in said hydraulic cylinder means; and
   pressure release means for time delay equalizing the pressure on each side of said piston means in response to movement of said piston means.

2. A collapsible steering column as claimed in claim 1 wherein said support bearing means further comprises:
   a first annular sleeve positioned immediately around said shaft adjacent said transverse groove, said first annular sleeve having radially positioned recessions in the interior surface of said first annular sleeve; and
   spring means positioned in said recessions.

3. A collapsible steering column as claimed in claim 2 wherein said disengageable roller means comprises spherical rollers positioned in said recessions against said spring means, said roller engaging with and freely rolling in said transverse groove, said springs tending to urge said spherical rollers in said transverse groove and said springs adapted to permit disengagement of said rollers from said groove in response to application of a predetermined external force along said shaft.

4. A collapsible steering column as claimed in claim 3 further comprising:
   a second annular sleeve positioned about said first annular sleeve; and
   roller bearing means positioned between said first and second annular sleeve, said bearing means permitting free relative rotational movement between said first annular sleeve and said second annular sleeve.

* * * * *